United States Patent [19]

Yamamoto et al.

[11] Patent Number: 4,870,444
[45] Date of Patent: Sep. 26, 1989

[54] COPYING APPARATUS

[75] Inventors: Takemi Yamamoto; Ryohei Komiya, both of Nagoya; Naoyuki Hatta, Gamagori; Yumio Matsumoto, Kasugai; Fumihiro Sunda, Nagoya, all of Japan

[73] Assignee: Brother Kogyo Kabushiki Kaisha, Aichi, Japan

[21] Appl. No.: 172,383

[22] Filed: Mar. 24, 1988

Related U.S. Application Data

[63] Continuation-in-part of Ser. No. 943,195, Dec. 18, 1986, Pat. No. 4,742,374.

[30] Foreign Application Priority Data

Jun. 10, 1987 [JP] Japan ............................. 62-89131[U]

[51] Int. Cl.$^4$ ...................... G03B 27/00; G03B 27/32; G03B 29/52
[52] U.S. Cl. .................. 355/1; 346/107 R; 355/27; 355/50
[58] Field of Search .............. 430/138; 355/1, 27, 355/100, 3 R, 50, 70; 346/107 R

[56] References Cited

U.S. PATENT DOCUMENTS

| | | | |
|---|---|---|---|
| 3,241,438 | 3/1966 | Frank | 355/50 |
| 3,592,114 | 7/1971 | Minett | 355/50 X |
| 3,592,542 | 7/1971 | Kaufer et al. | 355/50 |
| 4,372,679 | 2/1983 | Weber | 355/70 |
| 4,399,209 | 8/1983 | Sanders et al. | 430/138 |
| 4,440,846 | 4/1984 | Sanders et al. | 430/138 |
| 4,448,516 | 5/1984 | Arney et al. | 355/100 X |
| 4,595,275 | 6/1986 | Sonobe | 355/1 |
| 4,624,560 | 11/1986 | Beery | 430/138 X |
| 4,714,943 | 12/1987 | Sakakibara et al. | 355/27 |
| 4,742,374 | 5/1988 | Yamamoto et al. | 430/138 X |
| 4,792,924 | 2/1974 | Matsuda et al. | 355/3 R |
| 4,799,085 | 1/1989 | Nagumo et al. | 355/27 |

FOREIGN PATENT DOCUMENTS

| | | |
|---|---|---|
| 1351499 | 5/1974 | United Kingdom . |
| 1455770 | 10/1974 | United Kingdom . |
| 1545817 | 6/1976 | United Kingdom . |
| A2029036 | 8/1979 | United Kingdom . |
| A2079962 | 7/1981 | United Kingdom . |
| A2119939 | 3/1983 | United Kingdom . |

Primary Examiner—Richard A. Wintercorn
Attorney, Agent, or Firm—Oliff & Berridge

[57] ABSTRACT

A copying apparatus operable with an original having an image-bearing surface on which images to be reproduced are supported. A radiation reflected by the image bearing surface is focused on a photosensitive paper, by a self-focusing lens array, so that latent images corresponding to the images on the image-bearing surface are formed on the photosensitive paper. The latent images are developed into visible images by a developing device such as a device adapted to apply a pressure to the photosensitive paper. The photosensitive paper may be a self-activated type having a photosensitive material and a developer material which chemically react with each other in the developing process. Alternatively, a separate developer paper having a developer material is superposed on a photosensitive paper having only a photosensitive material. In this case, the photosensitive and developer papers are superposed on each other for development of the latent images due to the chemical reaction between the photosensitive and developer materials. After the development, the two papers are separated from each other by a separating device such as a roller separator.

16 Claims, 5 Drawing Sheets

COPYING APPARATUS

This is a continuation-in-part application of Ser. No. 943,195 filed Dec. 18, 1986 U.S. Pat. No. 4,742,374.

BACKGROUND OF THE INVENTION

1. Field of the Invention

The present invention relates generally to a copying or duplicating apparatus, and more particularly to a technique for easy and economical recording or reproduction of images or information.

2. Discussion of the Prior Art

As a copying machine, there is known an image-forming apparatus, for example, an electrostatic copier that employs principles of electrostatography. This type of copying machine uses a cylindrical sensitized or photoconductive drum whose outer surface is coated with a photoconductive material such as Se, ZnO, amorphous Si or an organic semiconductor. Areas of the outer surface of the photoconductive drum which correspond to a desired image to be reproduced are exposed to light, and electrostatically charged to form a latent electrostatic image. The latent image is developed by using a toner, and the toner image is then transferred to paper. This type of copying apparatus is characterized by its capability of reproducing images at a comparatively high speed.

3. Problem Solved by the Invention

However, the conventional copying apparatus of the type indicated above employs an optical system for producing the latent images on the photoconductive drum, and therefore requires extremely tight tolerances in the out-of-roundness and dimensional errors of the drum. Accordingly, the cost of manufacture of the drum and consequently the copying apparatus is made considerably high. Further, the electrostatography requires steps of charging the photoconductive medium, developing the latent images, cleaning and erasing the latent images. Repetition of this series of steps will lead to a relatively short life expectancy of the photoconductive medium. Moreover, the apparatus must incorporate complicated devices for performing these steps. The copying machine discussed above suffers from the above drawbacks.

SUMMARY OF THE INVENTION

It is accordingly an object of the present invention to provide a copying apparatus which is simple in construction, economical to manufacture, and durable in operation.

According to the present invention, there is provided a copying apparatus comprising an image-illuminating device for illuminating a surface of an original having images to be reproduced, and a photosensitive paper. The image-illuminating device is adapted to produce a light which is reflected by the image-bearing surface of the original. The reflected light includes rays to which the photosensitive paper is sensitive. The apparatus is characterized in that latent images are formed on the photosensitive paper by means of selective local exposure of the photosensitive paper to the rays of the reflected light from the image-bearing surface of the original.

In the copying apparatus of the present invention constructed as described above, the latent images corresponding to the images on the original are readily formed on the photosensitive paper by exposing the photosensitive paper to the rays of light which have been reflected by the original and to which the photosensitive paper is sensitive. Accordingly, the instant copying apparatus is simpler in construction, more economical to manufacture, and more durable in operation, than a conventional electrostatic copying machine which uses a sensitized drum coated with a photoconductive material.

Preferably, the photosensitive paper used in the present apparatus consists of a substrate, a developer layer formed on the substrate, and a multiplicity of microcapsules formed on or embedded in the developer layer. Each microcapsule includes: a photosensitive resin curable due to polymerization upon exposure to light; a colorless chromogenic material (color former which becomes a dye) which reacts with the developer layer to form a visible image spot; and a photoinitiator for promoting the polymerization of the photosensitive material. The microcapsules may be covered with a suitable outer coating. Upon exposure to the reflected rays from the original, the photosensitive resin of the microcapsules in the exposed areas of the photosensitive paper is polymerized and thus cured, while the photosensitive resin of the microcapsules in the unexposed areas remains uncured. The latent images on the photosensitive paper are developed into the visible image in a subsequent developing process under pressure, friction or heat. That is, the cured microcapsules are not ruptured under pressure, friction or heat, but the uncured microcapsules are ruptured, whereby the chromogenic materials come out of the ruptured microcapsules and react with the developer layer, producing the visible image spots on the photosensitive paper. This type of photosensitive paper is referred to as "self-activated" type. In the case where the photosensitive or radiation-curable resin of the photosensitive paper is cured upon exposure to light, the images reproduced on the photosensitive paper are not reversed with respect to the images on the original. However, if the photosensitive paper has microcapsules whose base resin is softened or becomes brittle upon exposure to light, the reproduced images on the photosensitive paper and the images on the original are reversed to each other. In the latter case, the photosensitive resin may consist of 3-oximino-2-butanone methacrylate which undergoes main chain scission upon light exposure, or poly 4'-alkyl acylo-phenones.

According to another feature of the invention, the apparatus uses a photosensitive paper having the microcapsules on its substrate, and a separate recording paper having the developer layer on its substrate. After the photosensitive paper is exposed to the reflected light, the photosensitive paper and the recording paper are superposed in face to face contact with each other and are subjected to a developing process. In this case, the photosensitive paper is used as a transfer sheet, and is referred to as "transfer" type.

The color of the images reproduced on the photosensitive paper of the "self-activated" type or transferred from the photosensitive paper of the "transfer" type to the recording paper (developer sheet), is determined by the kind of the chromogenic material contained in the microcapsules, and is not directly influenced by the wavelength of the light to which the photosensitive resin of the microcapsules is sensitive. Therefore, the color of the original images may be different from that of the images actually reproduced. Further, the images on the original may be formed of a material which reflect rays of light having wavelengths outside the visible spectrum.

BRIEF DESCRIPTION OF THE DRAWINGS

The above and other objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Figure 1:
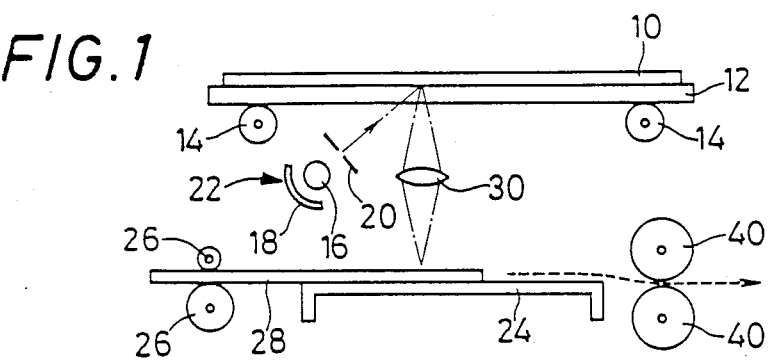
FIG. 1 is a schematic view showing a part of a copying apparatus according to one embodiment of the invention.

Referring first to FIG. 1, reference numeral 10 designates an original which has a source of information, that is, images to be reproduced, such as characters, data tables and graphs. The original 10 is placed on a transparent support plate 12 in the form of a glass sheet. This support plate 12 rests on support rollers 14 so that the support plate 12 is movable in a direction parallel to its plane and perpendicular to the axes of rotation of the rollers 14. The support rollers 14 are rotated by a suitable drive device not shown. Beneath the transparent support plate 12, there is fixedly disposed an image-illuminating device 22, which includes a light source 16, a reflector 18 and a slit-member 20 having a slit. The original 10 is placed on the support plate 12 such that the surface having the images to be reproduced is in face to face contact with the upper surface of the support plate 12. The lower image-bearing surface of the original 10 is illuminated by the image-illuminating device 22. The light source 16 consists of a rod-like light-emitting body which extends perpendicular to the direction of feed of the original 10. The light-emitting body produces a light beam which includes rays having a specific wavelength of $\lambda_0$. The reflector 18 extends parallel to the rod-like body of the light source 16, with a suitable distance therebetween in the radial direction of the light source 16. In this arrangement, a narrow local band on the original 10 perpendicular to its feeding direction is irradiated by a sheet of rays emitted by the image-illuminating device 22.

A table 24 is fixed a suitable distance below the the transparent support plate 12, in parallel relation with each other. This table 24 is provided to slidably support a recording sheet in the form of a photosensitive paper 28. The paper 28 is fed by feed rollers 26 in synchronization with the support plate 12, and at the same speed as the plate 12. Between the support plate 12 and the table 24, there is provided an optical system including a convex lens 30, so that latent images corresponding to the images on the lower image-bearing surface of the original 10 are formed on the surface of the photosensitive paper 28 on the table 24, by exposure to the rays of light which are reflected by the surface of the original 10 and which are focused by the optical system on the surface of the paper 28. More specifically, a space between the transparent support 12 and the table 24 is enclosed by walls (not shown), so as to provide a darkroom. The above-indicated narrow local band of the original 10 to be illuminated by the image-illuminating device 22 is shifted on the original 10 as the transparent support plate 12 is moved relative to the image-illuminating device 22. The portions of the photosensitive paper 28 corresponding to the illuminated bands of the original 10 are successively exposed to the rays of light reflected by the illuminated bands as the photosensitive paper 28 is fed on the table 24. In this manner, the latent images corresponding to the images on the original 10 are formed on the photosensitive paper 28.

Figure 2:
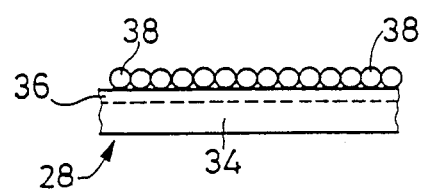
FIG. 2 is a fragmentary view of a structure of a photosensitive paper used in the copying apparatus of FIG. 1.

The photosensitive paper 28 used in this embodiment is of a self-activated type which is sensitive to the reflected rays having the specific wavelength $\lambda_0$, and in which the unexposed portions are given a suitable color. Stated more specifically referring to FIG. 2, the photosensitive paper 28 has a substrate 34, a developer layer 36 formed on the substrate 34, and a microcapsule layer consisting of a multiplicity of microcapsules 38 each of which contains a chromogenic material and a photoinitiator for promoting polymerization of the photosensitive material. The chromogenic material is not visible to the eyes, i.e., colorless until it reacts with the developer agent in the developer layer 36, as described below. The microcapsules 38 are coated at their outer surfaces with a suitable material, as needed. Each microcapsule 38 includes a photosensitive base resin which is hardened or cured upon polymerization thereof due to exposure to the rays of the specific wavelength $\lambda_0$, for example, blue light, in the presence of the photoinitiator. Thus, the microcapsules 38 undergo an increase in their mechanical strength upon exposure to the rays of the specified wavelength $\lambda_0$. The chromogenic material included in the microcapsules 38, which is colorless or invisible in its normal state as encapsulated in the radiation-curable base resin, produces a specific color, for example, black, upon reaction with the developer layer 36. The developer layer 36 contains a developer agent which reacts with the chromogenic material in the microcapsules 38. For example, the developer agent includes various resin acids and acid clays, such as acid earth, inorganic acid or organic acid, as used for pressure-sensitive or carbonless papers. The photosensitive or radiation-curable resin of the microcapsule 38 indicated above, which is generally covered with an outer coating, and which contains the photoinitiator, may be selected from the group consisting of: an ethylenically unsaturated organic compound having at least one terminal ethylene group per molecule; an acrylate prepolymer which is derived from the partial reaction of pentaerythritol with acrylic acid or acrylic acid esters; and an isocyanate modified ester. The chromogenic material may be selected from colorless compounds, used in carbonless papers, which have in their partial skeleton a lactone, a lactam, a sultone, a spiropyran, an ester or an amido structure. More specifically, the colorless compounds may be selected from the group consisting of: triarylmethane compounds; bisphenylmethane compounds; xanthene compounds; thiazine compounds; and spiropyran compounds.

On the downstream side of the table 24 as viewed in the feeding direction of the photosensitive paper 28, there are disposed a pair of nip rollers 40. The portion of the photosensitive paper 28 which has been exposed to the reflected light is passed through a pressure nip between the rollers 40, in order to rupture the microcapsules 38 in the unexposed areas of the photosensitive paper 28. As a result of the rupture of the microcapsules 38, the chromogenic materials go out of the ruptured microcapsules 38 in the unexposed areas, and are transferred to the developer layer 36, thus reacting with the developer material in the developer layer 36, and producing a visible image spot. Thus, the nip rollers 40 constitute a developing device of the instant copying or image transfer apparatus.

The operation of the instant copying apparatus will be described.

The original 10 on the support plate 12 is fed by the drive device not shown, in one direction, i.e., in the right direction as seen in FIG. 1. At the same time, the photosensitive paper 28 is fed by the feed rollers 26, in facing relation with the original 10. With the reflected light from the original 10, the microcapsules 38 on the photosensitive paper 28 are selectively exposed, depending upon the presence or absence of the images on the original 10. In the present embodiment, the images on the original 10 are positive, and the light emitted from the image-illuminating device 22 is reflected by non-image portions on the original 10.

Figure 3:
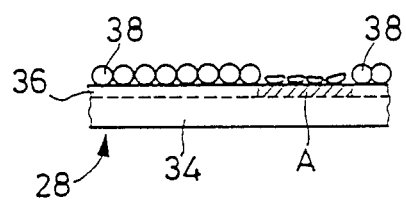
FIG. 3 is a view illustrating a state in which an image is developed on the photosensitive paper of FIG. 2.

The photosensitive or radiation-curable resin of the microcapsules 38 in the exposed areas on the photosensitive paper 28 is polymerized, and thus solidified or hardened, with a result of an increase in its mechanical strength. On the other hand, the radiation-curable resin of the microcapsules 38 in the unexposed areas remains unchanged in its mechanical strength. Upon passing of the photosensitive paper 28 through the pressure nip between the nip rollers 40, 40, the capsules 38 in the unexposed areas are ruptured, whereby the chromogenic materials in the ruptured capsules 38 react with the developer layer 36, producing visible image spots, as indicated at A in FIG. 3. Thus, the images on the original 10 are reproduced on the recording paper in the form of the photosensitive paper 28. Since the resin of the microcapsules 38 in the exposed portions is hardened, permanently encapsulating the chromogenic material in the hardened resin, it is not necessary to perform an otherwise required fixing step.

As described above, the instant copying apparatus does not require a photoconductive drum having extremely high out-of-roundness and dimensional accuracy, as used in a conventional electrostatic copying machine. Further, the instant copying apparatus is simpler, less expensive, and more durable, than the electrostatic copying machine which is equipped with various devices disposed around the photoconductive drum, for various steps such as charging, developing, cleaning and erasing that are repeatedly implemented on the photoconductive drum, as previously discussed.

Figure 4:
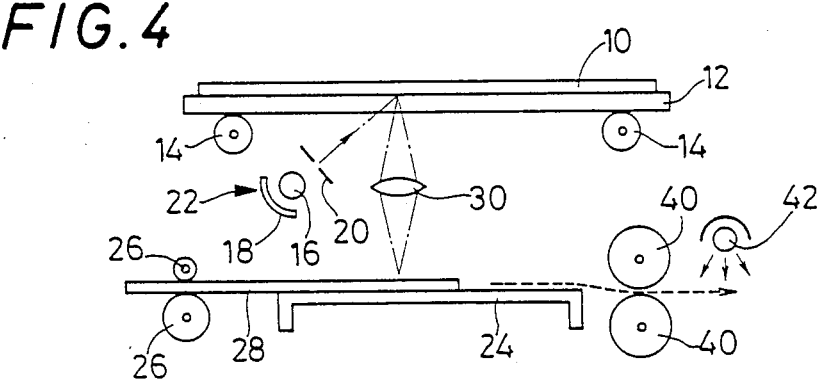
FIG. 4 is a view corresponding to that of FIG. 1, showing another embodiment of the invention.

Referring next to FIG. 4, another embodiment of the invention will be described. The same reference numerals as used in FIG. 1 are used in FIG. 4 to identify the corresponding components. In the interest of brevity and simplification, repeated description of these components will not be provided.

In the figure, there is shown an auxiliary illuminating device 42 adapted to re-illuminate the entire area of the photosensitive paper 28 after the paper 28 has passed the nip rollers 40. This auxiliary illuminating device 42 produces light which includes the rays having the wavelength $\lambda_0$. The amount of light produced by this illuminating device 42 need not be so large, as compared with that of the illuminating device 22. This will be understood by the fact that the amount of the light reflected by the original 10 is one several-hundredth, while the light emitted by the auxiliary illuminating device 42 is directly incident upon the surface of the photosensitive paper 28. In this respect, the device 42 may be replaced by an arrangement which conducts part of the radiation from the primary image-illuminating device 22, to the position downstream of the nip rollers 40, by using a suitable mirror or optical fiber.

The auxiliary illuminating device 42 is provided for the following purpose. That is, it is possible that some of the uncured microcapsules 38 have not been ruptured or not been sufficiently ruptured during passage through the pressure nip of the nip rollers 40. In this case, the non-ruptured or insufficiently ruptured microcapsules 38 may cause the reproduced images on the photosensitive paper 28 to be discolored or faded. To avoid this inconvenience, the uncured or insufficiently cured resin of the microcapsules 38 is re-cured to a sufficient extent, by direct exposure to the light radiated by the auxiliary illuminating device 42. Thus, the auxiliary illumination ensures complete elimination of the otherwise possible discoloration of the reproduced images.

Figure 5:
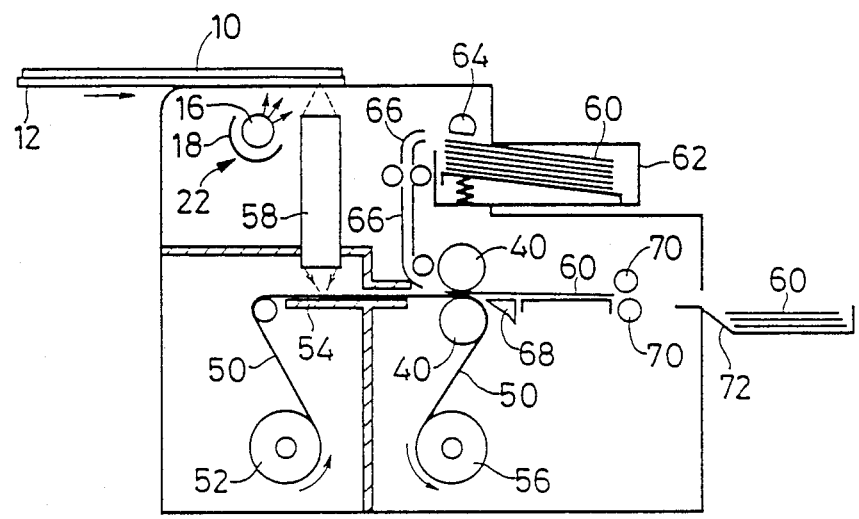
FIG. 5 is a schematic view showing a further embodiment of the invention.

Referring to FIG. 5, there is illustrated a further embodiment of the invention, wherein a photosensitive paper 50 carrying the microcapsules 38 is supplied from a feed roll 52, passed over an exposing platform 54, and eventually wound on a take-up roll 56. The portion of the photosensitive paper 50 on the exposing platform 54 is exposed to the reflected light from the original 10, which has passed through a self-focusing lens array 58. Thus, the latent images corresponding to the images on the original 10 are formed on the photosensitive paper 50. In this embodiment, however, this photosensitive paper 50 is used as an image transfer sheet, as described below.

The copying apparatus of the instant modified embodiment is equipped with a removable cassette 62 which accommodates a multiplicity of recording sheets of paper in the form of developer sheets 60 which includes the developer layer 36 as previously described. The developer sheets 60 are delivered one at a time by a feed roller 64, and guided by guide 66 to the pressure nip of the nip rollers 40, 40, so that the developer sheet 60 as the recording sheet, and the photosensitive paper 50 as the image transfer sheet are superposed on each other, and are passed together through the pressure nip. The microcapsules 38 in the unexposed areas of the image transfer sheet 50 are ruptured under pressure of the nip rollers 40, and are transferred to the developer layer 36 of the recording sheet 60, whereby the images are transferred to the sheet 60. The image transfer sheet 50 is then separated from the recording sheet 60 by a separator 68 disposed downstream of the nip rollers 40. In the meantime, the recording sheet 60 is fed by ejection rollers 70, 70 into a tray 72.

Figure 6:
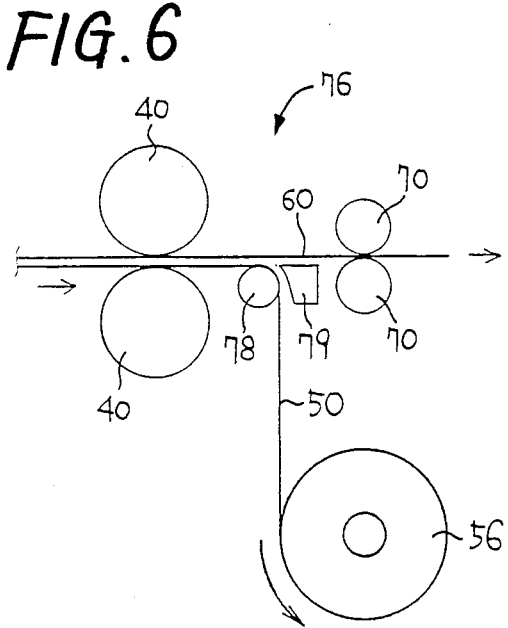
FIGS. 6 and 7 are fragmentary schematic views showing still further embodiments of the invention which use a separating device for separating a developer sheet from a photosensitive paper.

Referring next to FIG. 6, there is illustrated a separator device 76 of a roller type which is used in place of the wedge-shaped or triangular separator 68 used in the embodiment of FIG. 5. The photosensitive paper or image transfer sheet 50 which has passed through the pressure nip of the nip rollers 40, 40, is fed along a curvature of a separator roller 78 and re-wound on the take-up roll 56. In the meantime, the recording medium or developer sheet 60 superposed on the image transfer sheet 50 is fed straight forward past the separator roller 78, toward the ejection rollers 70, 70. The nip rollers 40 and the take-up roll 56 serve as a feeding device for feeding the photosensitive paper 50 and the developer sheet 60 past the separator roller 78.

Described more specifically, the separator roller 78 has a radius of curvature which is considerably smaller than that of the nip rollers 40 of the developing device. The separator roller 78 and the take-up roll 56 are positioned so that the photosensitive paper 50 is bent along the curvature of the separator roller 78, at right angles to the feeding path of the developer, sheet 60 leading to the nip of the ejection rollers 70. Thus, the photosensitive paper 50 is fed toward the take-up roll 56. As a result, the photosensitive paper 50 can be separated from the developer sheet 60 which tends to move forward past the separator roller 78, toward the ejection rollers 70 and tray 72, due to its relatively high rigidity. The radius of curvature of the separator roller 78 is determined to be small enough to permit the paper 50 and the sheet 60 to be easily separated from each other while the paper and sheet 50, 60 are fed past the separator roller 78. A guide 79 is disposed between the separator roller 78 and the ejection rollers 70, to facilitate the separation of the paper 50 and sheet 60 from each other. Namely, the guide 79 functions to guide the developer sheet 60 so as to move straight forward, even if the leading end of the sheet 60 tends to be bent along the curvature of the separator roller 78, together with the paper 50.

Figure 7:
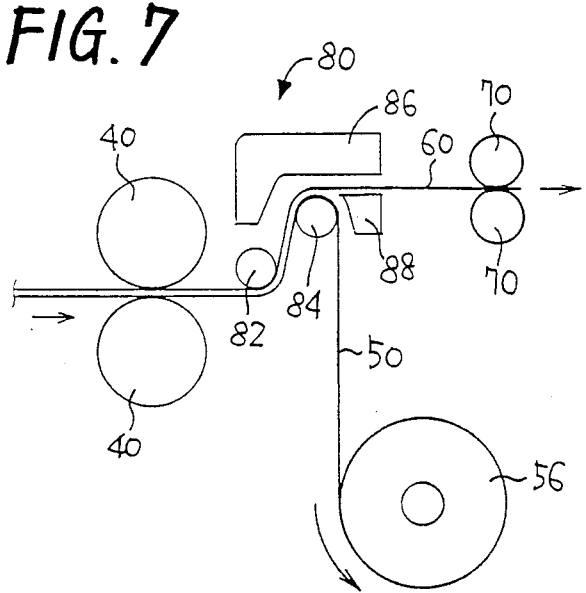

A modified separating device 80 of a roller type is shown in FIG. 7. The device 80 includes a first separator roller 82 and a second separator roller 84 which are disposed downstream of the nip rollers 40, in parallel relation with each other. Like the separator roller 78 of FIG. 6, these separator rollers 82, 84 have a considerably smaller radius of curvature than that of the nip rollers 40. The photosensitive paper 50 and the developer sheet 60 which have been fed from the nip rollers 40 are bent along the curvature of the first separate roller 82, to the side of the developer sheet 60, toward the second separator roller 84. The first and second separator rollers 82, 84 are positioned so that the path of the paper 50 and sheet 60 between these two separator rollers 82, 84 is almost perpendicular to the path between the nip rollers 40 and the first separator roller 82. The superposed photosensitive paper 50 and the developer sheet 60 which have been fed from the first separator roller 82 are bent along the curvature of the second separator roller 84, to the side of the photosensitive paper 50. However, the paper 50 and the sheet 60 are bent by different angles at the second separator roller 84. Described more particularly, the developer sheet 60 is bent along the second separator roller 84, by an angle of about 90 degrees, so that the path of the sheet 60 between the roller 84 and the nip of the ejection rollers 70 is almost parallel to the path between the nip of the nip rollers 40 and the first separator roller 82. On the other hand, the photosensitive paper 50 is bent by an angle of about 180 degrees, so that the path of the paper 50 between the roller 84 and the roll 56 is substantially perpendicular to the path of the developer sheet 60 between the second separator roller 84 and the ejection rollers 70. That is, the path of the paper 50 between the second separator roller 84 and the take-up roll 56 is almost parallel to the path between the first and second separator rollers 82, 84. Since the radius of curvature of the second separator roller 84 is sufficiently small, the photosensitive paper 50 which is bent almost perpendicularly to the developer sheet 60 can be easily separated from the developer sheet 60.

The separating device 80 further has a first and a second guide 86, 88 which are disposed adjacent to the second separator roller 84. The first guide 86 functions to guide the developer sheet 60 so as to be bent along the second separator roller 84 and move toward the ejector rollers 70 and tray 72. The second guide 88 serves the same function as the guide 79 provided in the separating device 76 of the preceding embodiment of FIG. 6. In the present separating device 80 wherein the paper 50 and sheet 60 are bent two times by the two separator rollers 82, 84, the separation of the paper 50 and sheet 60 can be accomplished more easily than in the device 76 of FIG. 6, since the leading end of the developer sheet 60 has a tendency of deviating from the curvature of the second separator roller 84 (while moving toward the ejector rollers 70, in sliding contact with the first guide 86), while the photosensitive paper 50 re-wound by the take-up roll 56 is held in close contact with the circumference of the second separator roller 84.

Figure 8:
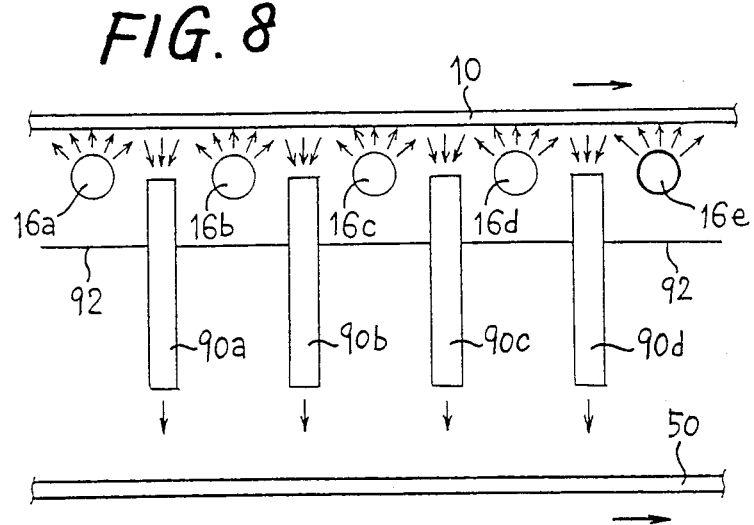
FIGS. 8, 9 and 10 are views illustrating a yet further embodiment of the invention which uses a plurality of self-focusing lens arrays disposed above a photosensitive paper.

Referring to FIG. 8, there is shown a plurality of self-focusing lens arrays 90a, 90b, 90c, 90d which are used in place of the self-focusing lens array 58 used in the embodiment of FIG. 5. The lens arrays 90a–90d are supported by a light-shielding plate 92, between the original 10 placed on a transparent plate (as indicated at 12 in FIG. 5), and the photosensitive paper 50. As described above with respect to the embodiment of FIG. 5, the original 10 and the photosensitive paper 50 are fed parallel to each other in the same direction as indicated in FIG. 8. Between the original 10 and the paper 50, there are also disposed a plurality of rod-like lamps 16a, 16b, 16c, 16d, 16e. These rod-like lamps 16a–16e are supported horizontally, also by the light-shielding plate 92, such that the lamps 16a–16e and the lens arrays 90a–90d are arranged alternately in the feeding direction of the original 10 and the paper 50. Each of the rod-like lamps 16a–16e uses a glass tube made of a material which transmits a ultraviolet radiation produced by the lamp. A lower part of the circumference of the glass tube, which faces the photosensitive paper 50, is coated at its inner or outer surface with a reflecting metal layer formed by vapor deposition. In this arrangement, the ultraviolet radiation produced by each lamp 16 transmits through the upper part of the glass tube facing the original 10, whereby the original 10 is irradiated by the radiation.

Figure 9:
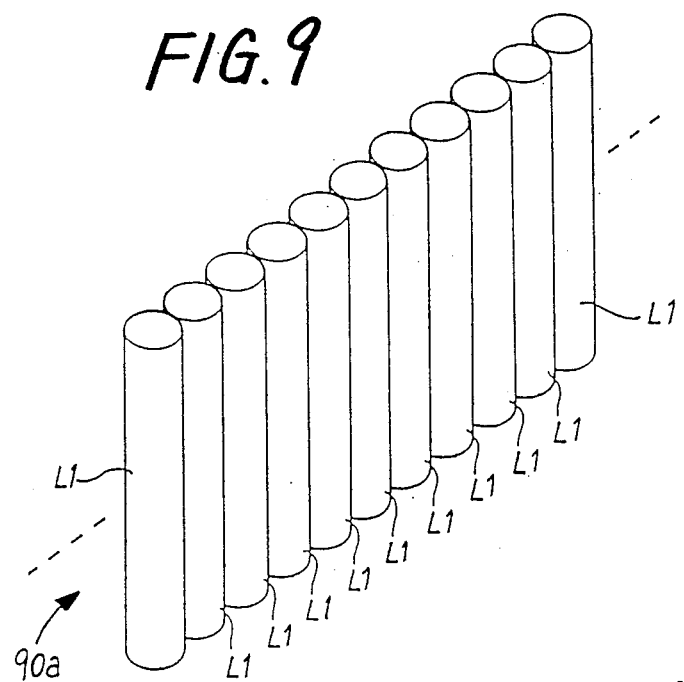

All the self-focusing lens arrays 90a–90d are identically constructed. The construction of the first lens array 90a is shown in the perspective view of FIG. 9, by way of example. The lens array 90a consists of a multiplicity of cylindrical rod lenses L1 which are disposed in a row perpendicular to the feeding direction of the original 10, such that the rod lenses L1 contact each other at their circumferential surfaces. Each rod lens L1 has a refractive index distribution wherein the refractive index decreases in the radially outward direction, whereby the rod lens L1 is capable of focusing the incident radiation reflected by the original 10, on the surface of the photosensitive paper 50.

Figure 10:
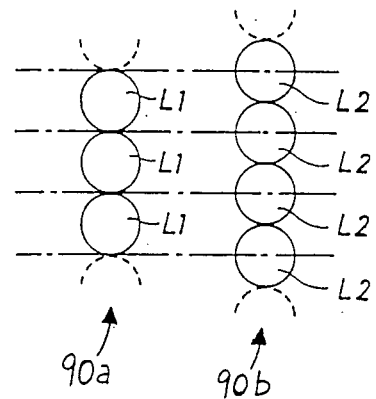

While the rod lenses of all the lens arrays 90a–90d may be aligned with each other in the direction of the rows, it is possible that the rod lenses of the adjacent lens arrays 90 are offset from each other. For example, the rod lenses L1 of the first lens array 90a are offset from the rod lenses L2 of the second lens array 90b, by a distance equal to the radius of the rod lenses, as indicated in FIG. 10. This arrangement assures increased uniformity of exposure of the photosensitive paper 50 to the radiation reflected by the original 10.

In the present embodiment wherein the multiple self-focusing lens arrays 90a–90d are provided such that the upper and lower end faces of the multiple rod lenses are located relatively close to the original 10 and the photosensitive paper 50, respectively, a higher percent of the radiation reflected by the original 10 is directed to the surface of the photosensitive paper 50, whereby the copying efficiency can be improved.

Figure 11:
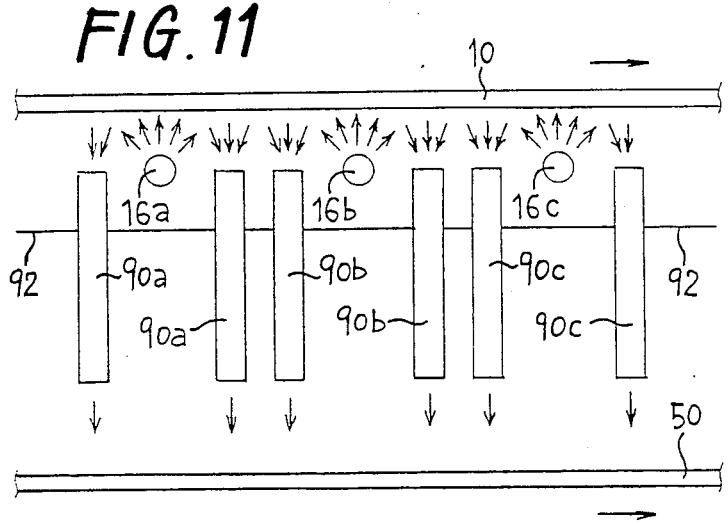
FIG. 11 is a view showing a modified form of the self-focusing lens arrays.

A modification of the self-focusing lens array system is shown in FIG. 11, wherein three lamps 16a, 16b, 16c are provided corresponding to three pairs of self-focusing lens arrays 90a, 90b and 90c. The lamps 16a–16c are spaced apart from each other in the feeding direction of the original 10, such that each of the lamps 16a–16c is disposed between the lens arrays of the corresponding pair. For example, the first lamp 16a is disposed between the first pair of lens arrays 90a. The instant arrangement has substantially the same advantage as the preceding arrangement of FIG. 8.

While the present invention has been described in its preferred embodiment, the invention may be otherwise embodied.

For example, it is appreciated that the images are reproduced in a desired color on the photosensitive paper 28 or 50, by using a suitable chromogenic material or color former of the microcapsules 38.

Although the illustrated embodiments of FIGS. 1 and 4 are adapted to feed both of the original 10 and the photosensitive paper 28, it is possible that one of the originals 10 and the photosensitive paper 28 is stationary while the other is fed with the optical system.

Although the separator roller 78 of FIG. 6 and the second separator roller 84 of FIG. 7 are adapted to contact the photosensitive paper 50, it is possible that these rollers 78, 84 contact the developer sheet 60. In this case, the developer sheet 60 is bent relative to the photosensitive paper 50 by an angle of about 90 degrees.

It will be understood that various other changes, modifications and improvements may be made in the invention, without departing from the spirit of the invention defined in the following claims.

What is claimed is:

1. A copying apparatus operable with an original having an image-bearing surface on which images to be reproduced are supported, comprising:
    an image-illuminating device operable to produce a light for illuminating said image-bearing surface of the original;
    a photosensitive paper disposed in facing relation with said image-bearing surface of the original, said photosensitive paper comprising a multiplicity of microcapsules each of which includes a chromogenic material, and a photosensitive resin which is sensitive to rays of a wavelength included in the light from said image-bearing surface;
    at least one self-focusing lens array for focusing said light on a surface of said photosensitive paper, to expose the photosensitive paper, for forming latent images corresponding to said images on said original; and
    a developing device for developing said latent images into visible images, by a chemical reaction between said chromogenic material of said microcapsules on said photosensitive paper and a developer material.

2. A copying apparatus operable with an original in the form of a sheet having an image-bearing surface on which images to be reproduced are supported, comprising:
    an image-illuminating device operable to produce a light for illuminating said image-bearing surface of the original;
    a photosensitive paper in the form of a web disposed in facing relation with said image-bearing surface of the original, said photosensitive paper being sensitive to rays of a wavelength included in the light reflected by said image-bearing surface;
    an optical system for converging and thereby focusing said reflected light on a surface of said photosensitive paper, to expose the photosensitive paper, for forming latent images corresponding to said images on said original;
    a recording paper in the form of a cut sheet having a developer layer;
    a developing device for superposing the exposed photosensitive paper and said recording paper on each other, and applying a pressure to said photosensitive paper and said recording paper toward each other, thereby developing said latent images into visible images on said recording paper;
    a feeding device for feeding the superposed photosensitive and recording papers through said developing device in a feeding direction; and
    a separating device disposed downstream of said developing device in said feeding direction, for bending only said web of the photosensitive paper so as to separate the exposed photosensitive paper from said recording paper.

3. A copying apparatus operable with an original in the form of a sheet having an image-bearing surface on which images to be reproduced are supported, comprising:
    an image-illuminating device operable to produce a light for illuminating said image-bearing surface of the original;
    a photosensitive paper of a transfer type disposed in facing relation with said image-bearing surface of the original, said photosensitive paper being sensitive to rays of a wavelength included in the light reflected by said image-bearing surface;
    an optical system for converging and thereby focusing said reflected light on a surface of said photosensitive paper, to expose the photosensitive paper, for forming latent images corresponding to said images on said original;
    a recording paper having a developer layer;
    a developing device for superposing the exposed photosensitive paper and said recording paper on each other, and applying a pressure to said photosensitive paper and said recording paper toward each other, thereby developing said latent images into visible images on said recording paper;

a feeding device for feeding the superposed photosensitive and recording papers through said developing device in a feeding direction; and a separating device including separator roller means consisting of a single separator roller disposed downstream of said developing device in said feeding direction, said separator roller having a radius of curvature along which one of said superposed photosensitive and recording papers fed from said developing device is bent so as to be separated from the other of said photosensitive and recording papers while said papers are fed past said separator roller by said feeding device, said radius of curvature being small enough to permit said photosensitive and recording papers to be separated from each other.

4. A copying apparatus according to claim 3, wherein said separating device further includes a guide disposed adjacent to said roller for guiding said other paper so as to move straight forward past said separator roller, and thereby facilitating the separation of said one of the papers bent by said separator roller, from said other paper, while said papers are fed past said separator roller.

5. A copying apparatus operable with an original in the form of sheet having an image-bearing surface on which images to be reproduced are supported, comprising:

an image-illuminating device operable to produce a light for illuminating said image-bearing surface of the original;

a photosensitive paper of a transfer type disposed in facing relation with said image-bearing surface of the original, said photosensitive paper being sensitive to rays of a wavelength included in the light reflected by said image-bearing surface;

an optical system for converging and thereby focusing said reflected light on a surface of said photosensitive paper, to expose the photosensitive paper, for forming latent images corresponding to said images on said original;

a recording paper having a developer layer;

a developing device for superposing the exposed photosensitive paper and said recording paper on each other, and applying a pressure to said photosensitive paper and said recording paper toward each other, thereby developing said latent images into visible images on said recording paper;

a feeding device for feeding the superposed photosensitive and recording paper through said developing device in a feeding direction; and a separating device including a first and a second separator roller disposed downstream of said developing device in said feeding direction, said first separator roller having a first radius of curvature along which said superposed photosensitive and recording papers fed from said developing device are bent, to one of opposite sides of said superposed papers, said second separator roller extending parallel to said first separator roller, and having a second radius of curvature along which said superposed photosensitive and recording papers which have been bent by said first separator roller are bent to the other side of the superposed papers, by a first and a second angle, respectively, a difference of said first and second angles being determined so as to permit said photosensitive and recording papers to be separated from each other while said papers are fed past said second separator roller by said feeding device, said second radius of curvature being small enough to permit said two papers to be separated from each other.

6. A copying apparatus according to claim 5, wherein said separating device further includes a first and a second guide which are disposed adjacent to said second separator roller, for guiding said photosensitive and recording papers along the second radius of curvature of said second separator roller, and thereby facilitating the separation of said photosensitive and recording papers from each other while said papers are fed past said second separator roller.

7. A copying apparatus according to claim 1, wherein said developer material is provided on said photosensitive paper for chemical reaction with said chromogentic material of image-wise selectively exposed microcapsules forming said latent images, said visible images being formed on said photosensitive paper.

8. A copying apparatus according to claim 1, wherein said developer material is provided as a developer layer formed on a recording paper, said developing device being operated to superpose said recording paper on said photosensitive paper which has been exposed through said at least one self-focusing lens array, said visible images being formed on said recording paper.

9. A copying apparatus according to claim 1, wherein a mechanical strength of said photosensitive resin of each said microcapsule of said photosensitive paper varies according to an amount of exposure thereof to said light from said image-bearing surface of the original, said developing device applying a pressure to said photosensitive paper to thereby rupture of said microcapsules according to the mechanical strength of said photosensitive resin, so that said chromogenic material of the ruptured microcapsules chemically reacts with said developer material, to form said visible images.

10. A copying apparatus according to claim 1, wherein said image-illuminating device and said at least one self-focusing lens array are disposed so that said light reflected by said image-bearing surface of the original is incident upon said at least one self-focusing lens array.

11. A copying apparatus according to claim 1, wherein said at least one self-focusing lens array consists of a plurality of self-focusing lens arrays which are spaced apart from each other in a feeding direction of said photosensitive paper, and which are concurrently used to expose said photosensitive paper.

12. A copying apparatus according to claim 11, wherein said plurality of self-focusing lens arrays comprise at least two lens arrays which are offset from each other by a predetermined amount in a direction perpendicular to said feeding direction.

13. A copying apparatus according to claim 11, wherein said image-illuminating device comprises a plurality of light sources which are disposed such that said light sources and said self-focusing lens arrays are arranged alternately in said feeding direction.

14. A copying apparatus according to claim 11, wherein said image-illuminating device comprises a plurality of light sources which are disposed such that two adjacent lens arrays of said plurality of self-focusing lens arrays are disposed between two light sources of said plurality of light sources, in said feeding direction.

15. A copying apparatus according to claim 2, wherein said separating device is operated to bend said web of the photosensitive paper while causing said cut sheet of the recording paper to move straight forward.

16. A copying apparatus according to claim 15, wherein said separating device includes a single separator roller for bending said web, and a guide for guiding said cut sheet so as to move straight forward past said separator roller.

* * * * *